United States Patent [19]

Ohtsuka

[11] Patent Number: 4,954,800

[45] Date of Patent: Sep. 4, 1990

[54] MAGNET AND METHOD OF MANUFACTURING THE SAME

[75] Inventor: Naoji Ohtsuka, Kawasaki, Japan

[73] Assignee: Canon Kabushiki Kaisha, Tokyo, Japan

[21] Appl. No.: 49,966

[22] Filed: May 15, 1987

[30] Foreign Application Priority Data

| May 20, 1986 | [JP] | Japan | 61-113583 |
| Feb. 7, 1987 | [JP] | Japan | 62-25583 |
| Feb. 7, 1987 | [JP] | Japan | 62-25584 |
| Feb. 7, 1987 | [JP] | Japan | 62-25585 |

[51] Int. Cl.$^5$ .................................. H01F 7/02
[52] U.S. Cl. .................................. 335/284; 335/303; 252/62.53
[58] Field of Search .............. 335/284, 302, 306, 303; 252/62.53, 62.54

[56] References Cited

U.S. PATENT DOCUMENTS

| 3,219,889 | 11/1965 | Polushkin | 335/284 |
| 4,580,121 | 4/1986 | Ogawa | 335/306 X |
| 4,638,281 | 1/1987 | Baermann | 335/303 |

FOREIGN PATENT DOCUMENTS

| 0181597 | 5/1986 | European Pat. Off. | 335/284 |
| 028287 | 8/1974 | Japan . | |
| 53038159 | 5/1975 | Japan . | |
| 0016450 | 2/1980 | Japan . | |
| 0108207 | 1/1981 | Japan . | |
| 0005045 | 9/1981 | Japan . | |
| 57-38002 | 8/1982 | Japan . | |
| 57-38003 | 8/1982 | Japan . | |
| 60037607 | 12/1983 | Japan . | |
| 0000905 | 3/1984 | Japan . | |
| 0206204 | 2/1986 | Japan . | |

Primary Examiner—George Harris
Attorney, Agent, or Firm—Fitzpatrick, Cella, Harper & Scinto

[57] ABSTRACT

This specification discloses a method of manufacturing a magnet roller having the step of disposing a plurality of pairs of magnetic poles each comprising the starting magnetic pole and terminal magnetic pole of a magnetic line of force on the peripheral surface of a cavity in a metal mold in which a resin magnet is molded and oriented so that straight lines passing through the starting magnetic poles and terminal magnetic poles of the pairs of magnetic poles are substantially on the same plane and extend through the cavity substantially in parallelism to one another, molding and orienting a resin magnet material poured into the cavity while applying a plurality of magnetic lines of force for orientation into the cavity in the same direction, thereby obtaining a molded article having at least four magnetic peaks, and the step of inverting part of the magnetic properties of the magnetic peaks of the molded article so that the magnetic properties of the adjacent magnetic peaks differ from each other.

4 Claims, 10 Drawing Sheets

MAGNET AND METHOD OF MANUFACTURING THE SAME

BACKGROUND OF THE INVENTION

1. Field of the Invention

This invention relates to a magnet member for use in a driving device using magnetism such as a motor, or a magnetic device using a magnetic roll, for example, a developing device in an apparatus using a developer to form images, and a method of manufacturing the same, and in particular to a method of magnetic orientation.

2. Related Background Art

Cylindrical resin magnets such as cylindrical isotropic resin magnets and cylindrical radial anisotropically oriented resin magnets for use in stepping motors or the like used in cameras, copying machines and other instruments are known.

In an isotropic resin magnet, magnetic powder in the resin magnet material is mixed in an indefinite direction and the readily magnetizable axes of the particles of the magnetic powder face in an indefinite direction and therefore, the magnet characteristic after magnetization is low.

Figure 1:
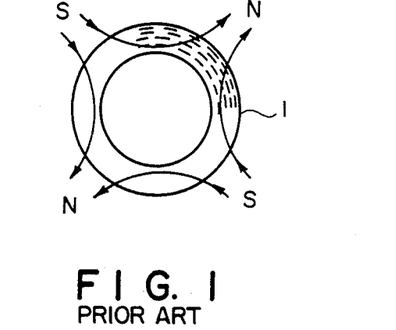
FIG. 1 is a schematic view of a radial anisotropically oriented resin magnet

In contrast, in the radial anisotropically oriented resin magnet as shown in FIG. 1 of the accompanying drawings, the readily magnetizable axes of the particles of the magnetic powder are oriented radially of the cylindrical resin magnet and the magnet characteristic after magnetization is good as compared with that of the isotropic resin magnet.

As a method of manufacturing such a radial anisotropically oriented cylindrical resin magnet, it has most often been the practice to magnetically orient magnetic powder in the radial direction during molding and effect magnetization along the magnetic orientation. This resin magnet magnetically oriented in the radial direction is excellent in industrial productivity and the orientational property thereof can be easily made very high. However, this orientation is in one linear direction and therefore, the orientation does not coincide with the direction of a magnetic flux provided when multipole magnetization is effected on the outer periphery of the magnet. Therefore, the magnetic flux passing through the magnet after magnetization is only in the radial direction and thus, it is magnetically closed in the air outside the magnet wherein the magnetic resistance is great, and the magnet becomes weak.

Figure 2A:
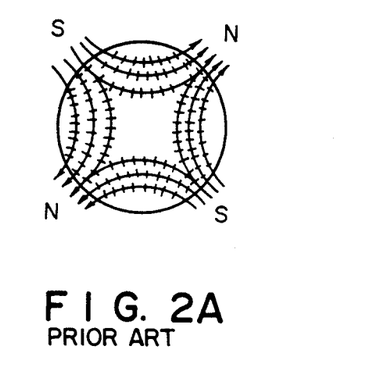
FIGS. 2A and 2B are schematic views of polar anisotropically oriented resin magnets according to the prior art.
Figure 2B:
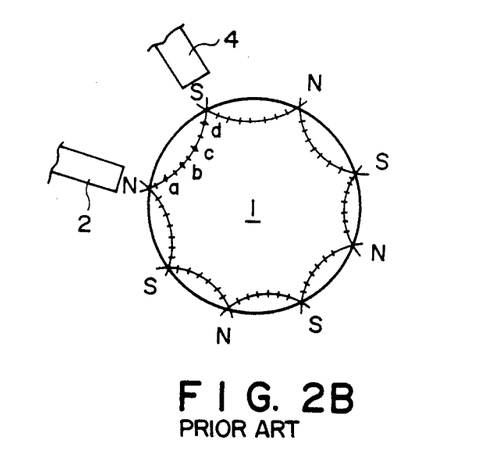

Further, a polar anisotropically oriented resin magnet exhibiting polar anisotropic orientation relative to the outer peripheral direction of the cylindrical resin magnet as shown in FIG. 2A of the accompanying drawings shown in Japanese Patent Publication No. 5045/1981 in order to improve the magnet characteristic is regarded as good. However, such a polar anisotropically oriented resin magnet according to the prior art has suffered from a disadvantage that the greater the number of poles, the greater the reduction in the degree of orientation of magnetic powder. That is, as the number of poles becomes greater, the main magnetic flux from the magnetic pole for orientation does not pass through the deep part of the molded article but passes through only the surface thereof which is at the shortest distance, and further, the intensity thereof reduces to a fraction of several to several tens as compared with the radial orientation or the axial orientation using opposed magnetic poles. This has led to a defect in principle that the degree of orientation is very much reduced by the combined effect thereof. That is, in an example wherein the number of magnetic poles is eight as shown in FIG. 2B, if magnetic pole members 2 and 4 are disposed at locations situated at poles designated by N and S to provide eight-pole orientation and a magnetic flux is passed from the N pole toward the S pole, the magnetic flux travelling from the N pole member 2 to the S pole member 4 will pass through the magnetic powder particles a, b, c and d in the molding resin material and at the same time, will flow along the outer peripheral surface of the molded article 1 and also pass through a non-magnetic member, not shown, present between the magnetic pole members 2 and 4, thus producing a leakage flux. As a result, the orientation of the magnetic powder near the central portion of the molded article is not so much enhanced in degree of orientation as desired or considered in designing. The degree of orientation in the central portion of the molded article is reduced as the number of magnetic poles is increased from eight to sixteen or thirty-two. Consequently, even if an attempt is made to increase the thickness of the molded article and enhance the magnetic characteristic of the magnet to thereby enhance the working point, the depth of the orientation from the surface layer and the degree of orientation will not change and therefore, in the case of multipole orientation, deep places exist while remaining isotropic and a great improvement is not obtained, and when the magnet is to be used as a high-speed rotating member, only the moment of inertia becomes great with a result that the starting frequency and the maximum response frequency are rather reduced.

Further, when the number of poles is significantly increased to obtain a magnet of high resolving power, there is a disadvantage that making a metal mold becomes very disadvantageous in terms of both space and strength, because the increased number of poles makes the pitch and angle between the magnetic poles smaller. Consequently, when it is desired to make a resin magnet having a number of poles greater than a certain degree, the only available method has been to magnetize a radially oriented article of a low magnetic characteristic and thus a magnet of high torque could not be obtained. As a magnet of high torque, there is one using a sintered radially oriented article of high magnetic characteristic, and such magnet can provide a high resolving power. However it is great in specific gravity as compared with a resin magnet and therefore, a magnet of high-speed rotation and high frequency response cannot be provided.

Also, an isotropic or anisotropic sintered magnet or a resin magnet attached to or forced into a core metal has heretofore been popular as a magnet roller used in a copying machine or other instrument. Also, in recent years, there have been made numerous applications including Japanese Laid-Open Patent Application No. 108207/1981 in which polar anisotropic orientation integral molding is internally effected by the application of Japanese Patent Publication No. 28287/1964 using the injection molding method or the aforementioned Japanese Patent Publication No. 5045/1981.

However, the attachment of the sintered magnets according to the prior art has suffered from such problems as being breakable, requiring a lot of time for adhesion, and high cost. Further, the sintered, integrally molded magnet has also suffered from such problems as low yield and low dimensional accuracy caused by burnout, warping or the like, and has unavoidably suffered from such problems as heavy weight and high cost attributable to secondary working. The attachment of a resin magnet by the use of rubber or plastics has also suffered from such problems as high cost attributable to adhesion, secondary working or the like. Therefore, in recent years, integrally molded articles using resin magnets have also appeared However, in fact, isotropic magnets lack the magnetic force. So, numerous attempts have been made to make magnet rollers anisotropic.

SUMMARY OF THE INVENTION

The present invention has been made in view of the above-noted problems, and an object thereof is to provide a method of manufacturing a multipole anisotropic resin magnet which enables an anisotropic resin magnet excellent in the magnetic characteristic in the radial direction or in the thickness direction to be obtained with good productivity and which enables an anisotropic resin magnet excellent in magnetic characteristic to be obtained even if the number of poles is increased considerably.

In a magnet member such as a long, solid or hollow magnet roller, radial orientation is impossible and therefore, integration by the application of the polar anisotropic orientation or two-pole orientation attempted in a roller for a motor is usually practiced. In the polar anisotropic orientation, there has been Proposed a method of disposing a coil in or outside a metal mold or disposing a permanent magnet in or outside the metal mold, but this method has the following problems.

(1) The system wherein a coil for producing a pulse magnetic field is contained in a metal mold only required a compact apparatus and is ideal, but due to the pulse width being short, the degree of orientation is not improved and a high performance article cannot be obtained. Particularly in a magnet roller for electrostatic development, a high surface magnetic flux density is required and therefore, a material having a high content of magnetic powder is used and thus, the apparent viscosity of the molding material is very high and in reality, it has been almost impossible to orient the material by the pulse magnetic field.

(2) The system wherein a permanent magnet is contained in a metal mold only requires a relatively compact apparatus and is effective, but again in the magnet roller, magnetic powder could not be completely oriented because of the high viscosity of the molding material. Also, in mass production, the molded article is intensely attracted to the metal mold and therefore, deformation such as warping is caused unless the cycle is lengthened until the molded article is completely cooled when it is parted from the metal mold. This reduces the yield and results in inefficient mass production.

Figure 3:
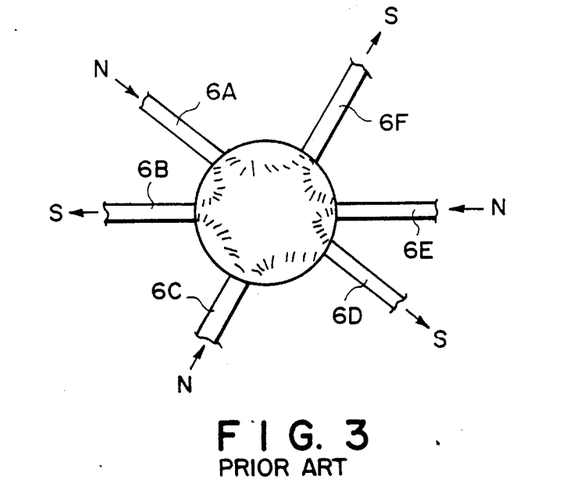
FIG. 3 schematically shows the method of orientation using the polar anisotropic orientation and molding according to the prior art.

(3) With regard to the system wherein a coil for producing a static magnetic field is contained in a metal mold, where the number of poles is made greater than two and the poles are oriented polar-anisotropically, the magnetic pole members 6A-6F in the metal mold are arranged in various directions as shown in FIG. 3 of the accompanying drawings and therefore, the cavity cannot be arranged on the parting line. The space around the cavity becomes large and furthermore, a large space for containing therein an exciting coil, not shown, becomes necessary. This has led to a limited number of metal molds provided, which also has led to low productivity.

(4) With regard also to the system wherein a coil for producing a static magnetic field is installed outside a metal mold, where the number of poles is made greater than two and the poles are oriented polar-anisotropically, the arrangement of the magnetic poles near the cavity becomes similar to that described in magnet (3) above, and this has led to a similar problem at the same time, the magnetic path connected to the coil outside the metal mold becomes wider in and outside the metal mold, and this has led to a problem that the space necessary to form a cavity becomes much wider than in the internally containing type. Therefore, it has also been very difficult to provide a number of metal molds, which in turn has led to a low productivity.

(5) Further, in the performance of the magnet roller, where the number of poles is made greater than four, the reduction in degree of orientation which is a disadvantage peculiar to the polar anisotropic orientation occurs and orientation is effected only in the portion near the surface layer. Furthermore, the magnetic powder in the portion near the center is not effectively utilized, and this leads to the disadvantage that magnetic efficiency is reduced. This is attributable to the following two great disadvantages in principle.

Figures 4A, 4B, 5:
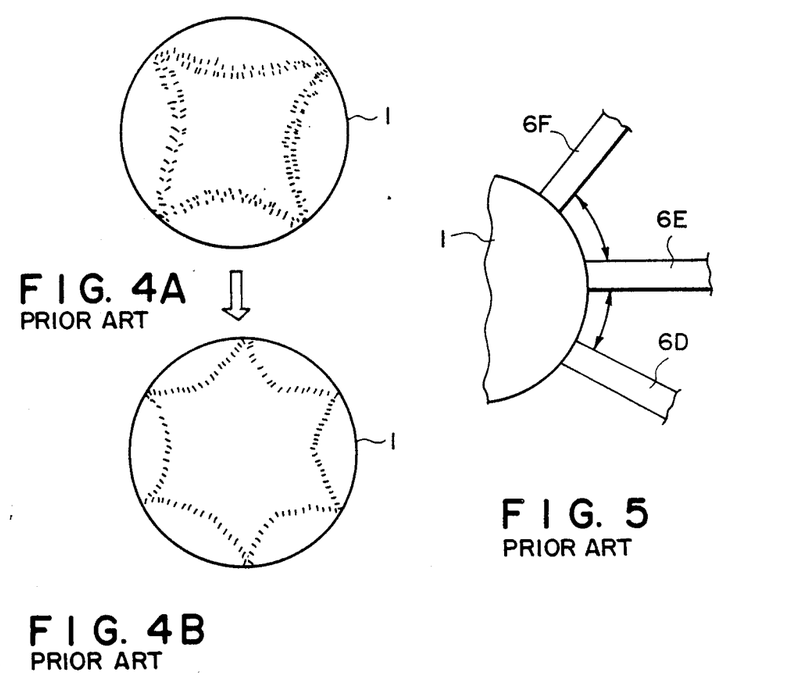
FIGS. 4A and 4B are cross-sectional views of polar anisotropically oriented articles
FIG. 5 is a schematic view showing the problems peculiar to the method of orientation using the polar anisotropic orientation and molding according to the prior art.

(a) As shown in FIGS. 4A and 4B of the accompanying drawings, as the number of poles is increased, between the adjacent pairs of magnetic poles which provide a magnetic circuit which is the principle of polar anisotropic orientation, the portion between the magnetic pole gaps which provides the chord connecting said adjacent pairs of magnetic poles at the shortest distance and to which a magnetic field is applied most intensely moves toward the outer surface relative to the center of the cavity. Therefore, in the central portion, orientation can be accomplished only by a very weak leakage flux defined by the permeance between the gap of the magnetic poles. In a magnet having a high content of magnetic powder such as a magnet roller, the apparent viscosity of the material is very high, and this has led to the disadvantage that the magnetic powder cannot be completely oriented and the magnetic characteristic thereof is reduced.

(b) Further, as the number of magnetic poles is increased, the pairs of magnetic poles are not disposed in opposed relationship with one another, and this leads to the disadvantage that the magnetic line of force does not pass through the gap in the cavity between the adjacent magnetic poles which provide a magnetic circuit, but leads directly between the magnetic poles 6D-6E and 6E-6F around the cavity as indicated by arrows in FIG. 5 of the accompanying drawings. Therefore, the efficiency of the magnetic circuit in the metal mold is greatly reduced, with a result that the degree of orientation is also reduced, and this has led to a disadvantage that the magnetic characteristic is reduced.

(6) Further, as a method of manufacturing a rotor not for electrostatic development but for a motor, a method of effecting molding and orientation in one direction by two poles and using them for magnetization of multiple poles is disclosed in Japanese Utility Model Publication No. 38159/1978 and Japanese Laid-Open Patent Application No. 112310/1986. According to these publications, no description is made regarding the problem that the magnetic poles widen in multiple directions in the metal mold can be solved, but it an be readily inferred. However, in these methods according to the prior art, the following problems have been encountered when a magnet roller for electrostatic development has been manufactured.

(A) The magnetic force is weak.

Figure 7A:
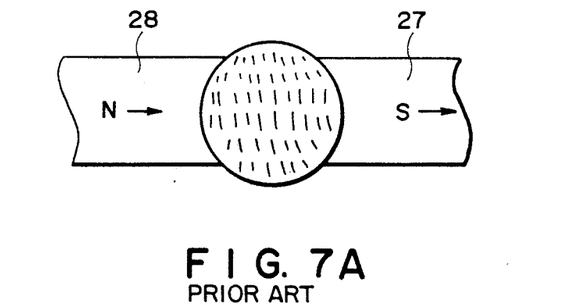
FIG. 7 is a cross-sectional view of a magnet roller provided by re-magnetizing a two-pole oriented article after demagnetizing it.
Figure 7B:
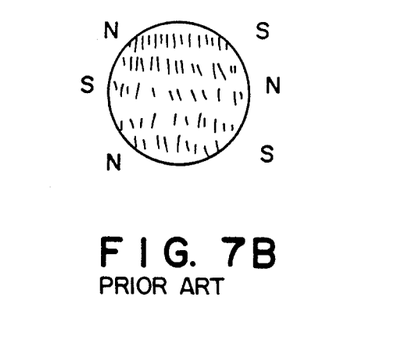

In the case of polar anisotropic orientation, almost all of the volume of the magnet roller is effectively used and therefore, unless multiple poles are adopted, the magnetic efficiency is also good in the metal mold and it is possible to enhance the degree of orientation. However, in the case of two-pole orientation multipole magnetization, orientation is effected by the use of uniformly parallel magnetic fields as shown in FIG. 7A of the accompanying drawings and therefore, the result is a molded article as shown in FIG. 7B of the accompanying drawings. For this reason, not all of the energy of the individual particles of the magnetic powder in the magnet roller is on a straight line relative to a location at which the energy requires a high value as the surface magnetic flux. Instead, at a location a little far from the magnetic pole position on the magnet, the direction deviates as a magnetic path from the location at which the surface magnetic flux density is necessary and therefore, and the result is that the magnetic efficiency is reduced correspondingly to the deviation of the vector although the degree of orientation is high as in the case of radial orientation, also, during magnetization, the vector deviates because the deviated portion is not a magnetic path, and such portion is not fully magnetized to the maximum value of the magnetic force which can be displayed by each particle of the magnetic powder. This leads to the disadvantage that the result is considerably inferior to that in the case of polar anisotropic orientation, although it is apparently good.

(B) The distribution characteristic cannot be controlled.

The necessary characteristics of a magnet roller for electrostatic development include the aforementioned high surface magnetic flux density and in addition, the quality of the distribution characteristic of the magnetic flux emitted from the magnet roller into the space as what particularly affects the image characteristic. Polar anisotropic orientation poses no problem in this respect, but it has been found that a two-pole oriented multipole magnetized magnet roller suffers from various disadvantages in this respect. That is, in the magnet roller, uniform upright erection of toner is necessary at the developing portion or the like, and it is also necessary in design to sharply make the surface magnetic flux density partly high or low in the circumferential distribution. However, in the method of effecting two-pole orientation multipole magnetization, as described above, the anisotropic direction of the magnetic powder only faces in a single direction at the necessary magnetic pole position on the magnet roller and does not converge so as to assume the necessary wave form. Therefore, the surface magnetic flux density wave form also has a distribution primarily determined by the magnetic powder facing in the single direction, and it has been very difficult to control the wave form by only the shape of the magnetizing yoke and the intensity of magnetization. Still more, it has been entirely impossible to effect magnetization at full power and at the same time, control the distribution wave form in order to increase the absolute value of the surface magnetic flux density. That is, in a magnet roller to which polar anisotropic orientation is applied, there is the disadvantage that where the number of poles is small, industrial productivity is very low although the distribution and height of the surface magnetic flux density can be satisfied at a time. In a magnet roller to which two-pole orientation multipole magnetization is applied, there is the disadvantage that productivity is high, but nothing which clears the height and distribution characteristics of the surface magnetic flux density can be provided.

The present invention has been made in view of the above-noted problems and an object thereof is to provide a method of manufacturing a magnet roller which can orient even a material having a high content of magnetic powder powerfully and with a good degree of orientation to thereby provide a strong magnetic force and can control the height and distribution of the surface magnetic flux density and is good in yield and productivity.

DESCRIPTION OF THE PREFERRED EMBODIMENTS

The first object of the present invention is achieved by a method of making a multipole anistropic resin magnet in which a composition of a resin magnet material containing magnetic powder is oriented multipole-anisotropically while being made molten in a molding space, whereafter magnetization is effected at a number of poles twice or more as great as the number of poles for the orientation.

A first embodiment of the present invention will hereinafter be described with reference to the drawings FIGS. 8 to 11 show the steps of making the simplest multipole anisotropic resin magnet according to the present invention, i.e., a four-pole anisotropic resin magnet.

Figure 8:
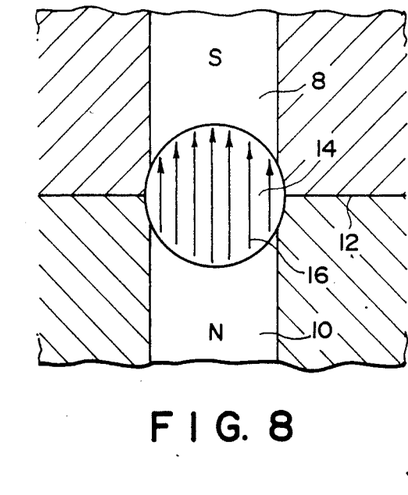
FIG. 8 illustrates a method of magnetizing a magnet which is a first embodiment of the present invention.
Figure 9:
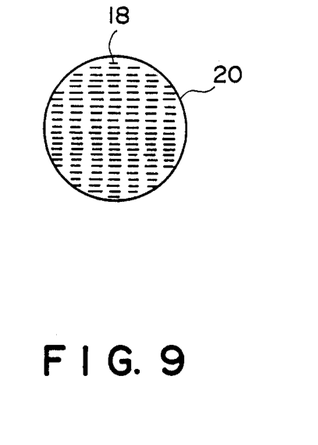
FIG. 9 schematically shows the state of magnetic powder oriented by two poles.
Figure 10:
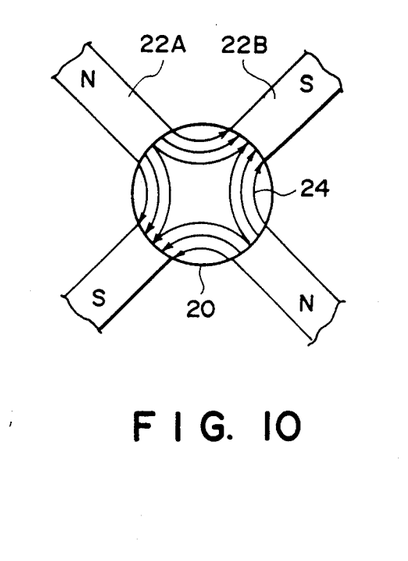
FIG. 10 schematically shows the step of magnetizing four poles.
Figure 11:
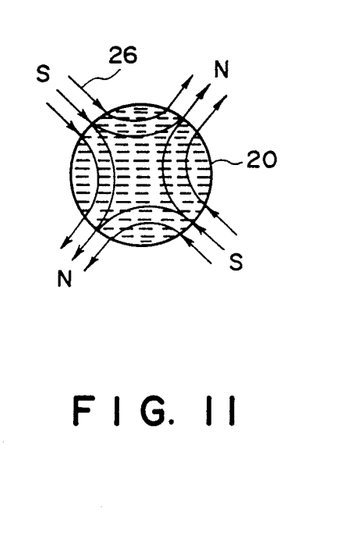
FIG. 11 schematically shows the state of magnetic powder after magnetized by four poles and the flow of magnetic flux.

FIG. 8 shows the molding and orientation by two N and S poles, FIG. 9 shows the state of magnetic powder oriented by the two poles, FIG. 10 shows the magnetization by four poles, and FIG. 11 shows the state of the magnetic powder and the flow of magnetic flux after the magnetization by four poles has been effected.

In these figures, reference numeral 8 designates an S pole which is a magnetic pole for orientation, reference numeral 10 denotes an N pole, reference numeral 12 designate the parting line of a metal mold, reference numeral 14 denotes a cavity in the metal mold, reference numeral 16 designates the flows of magnetic flux in the cavity, reference numeral 18 denotes magnetic powder in a molded article, reference numeral 20 designates a molded article molded and oriented in the cavity 14, reference character 22A denotes an N pole which is the magnetic pole of a magnetizing yoke, reference character 22B designates an S pole, reference numeral 24 denotes the flows of magnetic flux produced from the magnetizing yoke which is to provide the surface magnetic flux density of the finally obtained molded article by the magnetic poles of the magnetizing yoke, and reference numeral 26 designates the flows of magnetic flux produced by the finally molded article.

Figure 12:
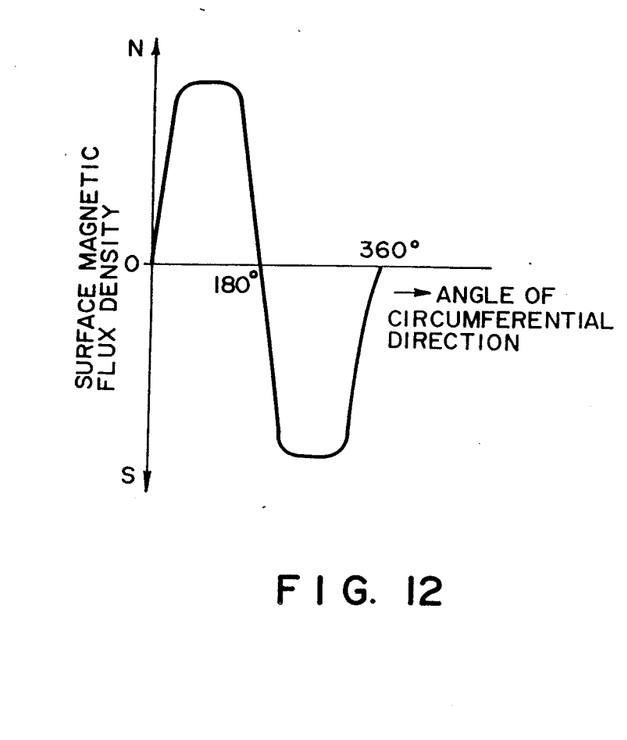
FIG. 12 is a graph showing the distribution of the surface magnetic flux density in the circumferential direction of a molded article molded and oriented by the metal mold of FIG. 8.
Figure 13:
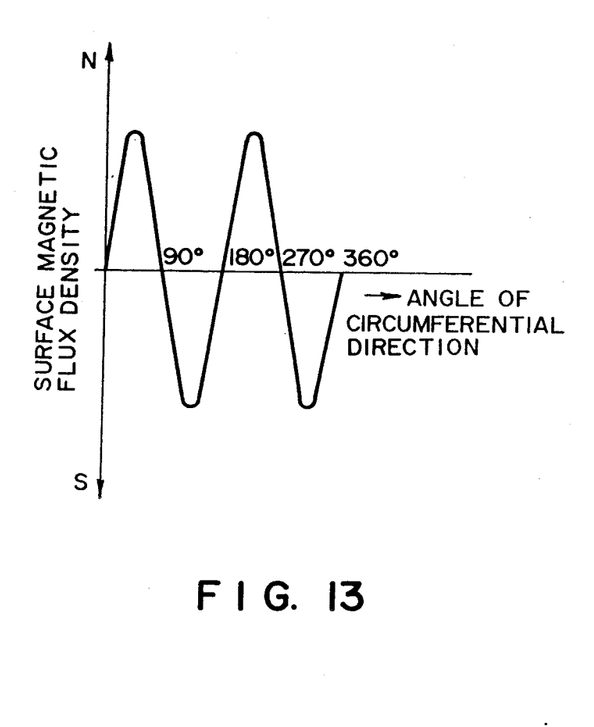
FIG. 13 is a graph showing the distribution of the surface magnetic flux density in the circumferential direction of the molded article (FIG. 9) obtained finally.

FIG. 12 shows the distribution of surface magnetic flux density in the circumferential direction of a molded article molded and oriented by the metal mold of FIG. 8, and FIG. 13 shows the distribution of surface magnetic flux density in the circumferential direction of a finally obtained molded article (FIG. 11).

Via the manufacturing process as described above, a multipole resin magnet is obtained, for example, in the following manner.

Figures 17, 18, 19:
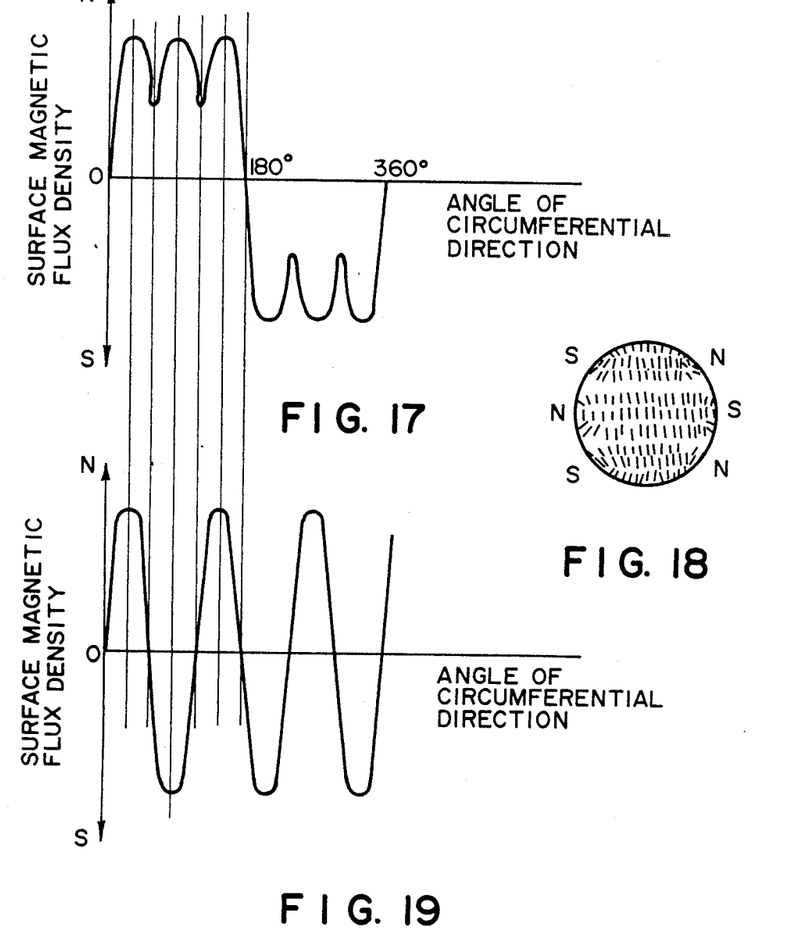
FIG. 17 is a graph showing the magnetic flux distribution on the peripheral surface of the magnet roller after molded and taken out.
FIG. 18 is a cross-sectional view of the magnet roller after magnetized.
FIG. 19 is a graph showing the magnetic flux distribution on the peripheral surface of the magnet roller after magnetized.

A magnetic field is first applied to the magnetic poles 8 and 10 of the cavity of FIG. 8 by an electromagnet (not shown) outside the metal mold, and a resin magnet material in its molten state is poured into the cavity. By this operation, the magnetic powder is oriented as shown in FIG. 9. At this time, the magnetic powder 18 is rotated in the direction of the flow 16 or magnetic flux shown in FIG. 8 by the magnetic anisotropy of the magnetic powder 18 and is molded and oriented when a resin binder is in its molten state while a magnetic chain is caused between the particles of the magnetic powder in the state in which the molded article has been taken out after the resin has been cooled, the magnetic direction thereof is governed by the direction of orientation of the magnetic powder and the distribution of surface magnetic flux density in the circumferential direction of the molded article is such as shown in FIG. 12 Subsequently, the molded article shown in FIG. 9 is inserted into a magnetizing yoke as shown in FIG. 10 which has a number of poles (four poles) twice as great as the number of poles used for molding and orientation. A magnetic field having the direction and distribution of magnetic flux as indicated at 24 in FIG. 10 is then applied to the molded article of FIG. 9. As a result, a finally molded article having the distribution of magnetic directionality as shown in FIG. 11 is obtained. The subsequent distribution of surface magnetic flux density in the circumferential direction is shown in FIG. 19.

According to the manufacturing method of the present invention, as described above, magnetization is effected in the location wherein the magnetic powder has already been oriented anisotropically and the readily magnetizable axes locally face in the same direction and therefore, the magnetic flux for magnetization is easy to flow through the resin magnet along the readily magnetizable axes and magnetization can be accomplished with a good magnetic characteristic. Particularly in the above-described embodiment, the position of the yoke during molding and orientation and the position of the yoke during magnetization deviate from each other by 45°, and therefore, as shown in FIG. 17, there is created the flow of magnetic flux in the same direction as the readily magnetizable axes and the flow of magnetic flux in a direction which is not coincident with the readily magnetizable axes, and with regard to the flow of magnetic flux in the same direction as the readily magnetizable axes, magnetization can be accomplished with very good magnetic efficiency, and thus, as the entire resin magnet, multipole anisotropic orientation of high performance is effected. The deviation between the position of the yoke during molding and orientation and the position of the yoke during magnetization is not limited to 45°, and magnetization may also be effected without the deviation.

In the above-described embodiment, a magnet finally having four magnetic poles has been manufactured, and the present invention is particularly effective in the manufacture of a resin magnet having numerous poles, and according to the present invention, a resin magnet having numerous magnetic poles such as sixteen or thirty-two poles can be manufactured with a good magnetic characteristic.

Also, in the method of manufacturing the multipole anisotropic resin magnet of the present invention, the injection molding method and other molding methods may be used as the molding method.

In the manufacture of a resin magnet in which magnetization of four poles is finally effected as in the above-described embodiment, the metal mold used $ for molding and orientation has two poles and has a space in reserve along the parting line as shown in FIG. 8 and therefore, metal molds can be arranged parallel to each other and extended in that portion to provide a number of metal molds three to six times as many. In the prior-art method, magnetic poles are also present in this portion and therefore, it is impossible to provide such a great number of metal molds.

When finally molded articles having the same number of magnetic poles are to be manufactured by the method of manufacturing the multipole anisotropic resin magnet of the present invention and the manufacturing method according to the prior art, the number of magnetic poles installed in the metal mold during molding and orientation may be one-half in the present invention as compared with the prior art, and the distance between the magnetic poles is long and therefore, the inter-pole leak of magnetic flux is not liable to occur and the magnetic flux can be efficiently used for orientation. Conversely speaking, magnetization up to twice is possible as compared with the prior-art method, and it may be said that manufacture of a resin magnet having a number of poles that could not be provided by the prior-art method is also possible.

According to the method of manufacturing the multipole anisotropic resin magnet of the present invention, as described above, a resin magnet having a considerably great number of poles can be manufactured without the magnetic performance thereof being reduced, and also the metal mold during molding and orientation has a space in reserve and therefore, provision of numerous metal molds is possible and this leads to good productivity.

Description will now be made of an embodiment of a long type magnetic roller for use in an image forming apparatus or the like which is the second object of the present invention.

The above object of the present invention is achieved by a method of manufacturing a magnet roller having the step of molding and orienting a mixture of polar magnetic powder and a binder in a cavity in a metal mold while applying a magnetic line of force for orientation thereto, and further having the step of disposing a plurality of pairs of magnetic poles each comprising the starting magnetic pole and the terminal magnetic pole of the magnetic line of force on the peripheral surface of the cavity in the metal mold so that the straight lines passing through the starting magnetic poles and the terminal magnetic poles of said pairs of magnetic poles are substantially on the same plane and extend through the cavity substantially in parallel to each other, and effecting molding and orientation so that the molded article has at least four magnetic peaks while applying a plurality of magnetic lines of force for orientation into said cavity in the same direction, and the step of remagnetizing said molded article so that the adjacent magnetic peaks of said molded article differs in magnetic property from each other.

In the method of the present embodiment, a conventional material is used as the resin magnet material (ferromagnetic powder and a binder), but during molding and orientation, the force for orientation is great due to a magnetic line of force flowing to the molded article in one direction and therefore, all the magnetic powder in the central portion of the magnet roller is also oriented and thus, even a material containing a great amount of ferromagnetic powder can be used without difficulty.

Figure 14:
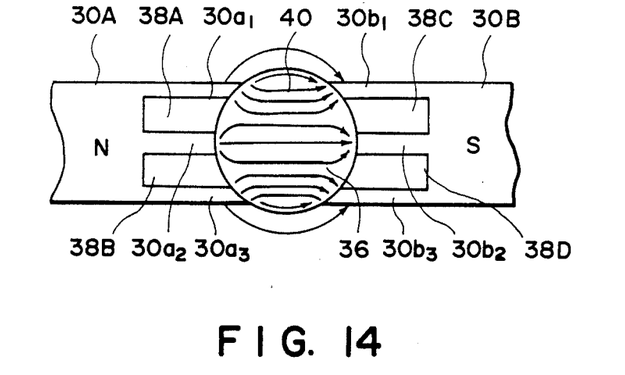
FIG. 14 is a cross-sectional view of the vicinity of the cavity in the metal mold of the present invention.

In the present embodiment, the surface magnetic flux density of the molded article can be simply controlled by varying the quality of the ferromagnetic material forming the magnetic pole for applying a magnetic line of force for orientation and by varying the cross-sectional area of the magnetic pole, or by varying both of them. That is, the amount of magnetic flux passing between the magnetic poles is varied by the above-described method to vary the volume ratio itself of the oriented magnetic powder by the magnetic chain occurring to each pole in the molded article, whereby the control of the distribution of surface magnetic flux density is accomplished in the fully magnetized state of each pole without the strength and weakness of magnetization being distinguished from each other while the maximum energy of all magnetic powder of the magnet roller is being taken out The present embodiment will hereinafter be described specifically with reference to the drawings FIGS. 14 to 19 schematically illustrates the steps of process of the present embodiment FIG. 14 is a view of the portion around the cavity in the metal mold best showing the features of the present invention In FIG. 14, reference characters 30A and 30B designate magnetic poles opposed to each other with the cavity interposed therebetween and formed of a ferromagnetic material. These magnetic poles 30A and 30B are for directing the magnetic fluxes from magnetic field producing coils designated by 32A and 32B in FIG. 6 to the cavity in the metal mold through the platens 34A and 34B of a molding machine. Reference characters $30a_1$, $30a_2$, $30a_3$, $30b_1$, $30b_2$ and $30b_3$ denote magnetic poles formed integrally with the magnetic poles 30A and 30B and disposed in substantially opposed relationship with one another with a cylindrically shaped cavity space 36 interposed therebetween. That is, the magnetic poles $30a_1$, $30a_2$, $30a_3$ which are the starting magnetic poles from which magnetic lines of force flow out and the terminal magnetic poles $30b_1$, $30b_2$, $30b_3$ into which the magnetic lines of force flow are arranged in face-to-face relationship with one another, and the magnetic poles $30a_1$ and $30b_1$, $30a_2$ and $30b_2$, and $30a_3$ and $30b_3$ form respective pairs of magnetic poles, and these magnetic poles are arranged so that the line passing through the magnetic poles $30a_1$ and $30b_1$, the line passing through the magnetic poles $30a_2$ and $30b_2$ and the line passing through the magnetic poles $30a_3$ and $30b_3$ are substantially on the same plane and substantially parallel to one another. Each of these magnetic poles is formed of a conventional ferromagnetic material. Reference characters 38A, 38B, 38C and 38D designate spacers formed of a non-magnetic material Reference characters 46A and 46B denote a movable metal mold and a fixed metal mold, respectively.

Figure 6:
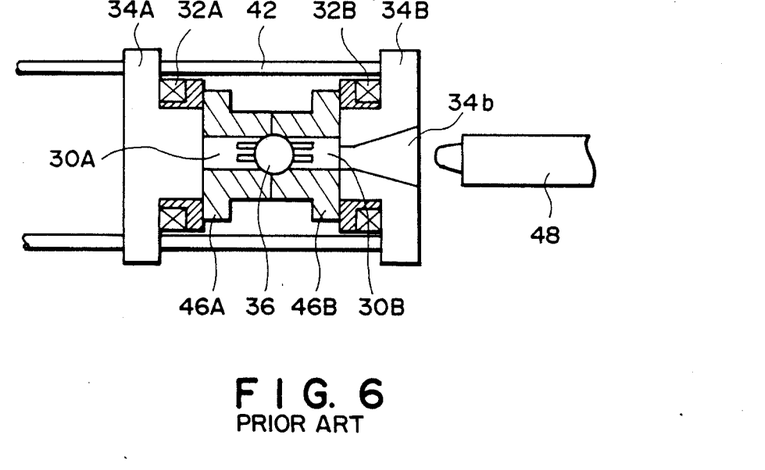
FIG. 6 shows a molding apparatus and a metal mold portion.

In such a construction, when an electric current flows to the magnetic field producing coils 32B and 32A shown in FIG. 6, the magnetic flux (magnetic line of force) produce through the platen 34A of the molding machine on the movable side, and divides from the magnetic pole 30A in the metal mold which is formed of a ferromagnetic material to the magnetic poles (starting magnetic poles) $30a_1$, $30a_2$, $30a_3$ and flows into the cavity 36 and further flows in accordance with the distribution of permeance between gaps as indicated at 40 in FIG. 14 so as to collect into the opposed magnetic poles (terminal magnetic poles) $30b_1$, $30b_2$, $30b_3$. That magnetic flux is designed to pass through the magnetic pole 30B and through the platen 34B on the fixed side shown in FIG. 6 and further through a tie bar designated by 42 and form a closed loop.

Figure 15:
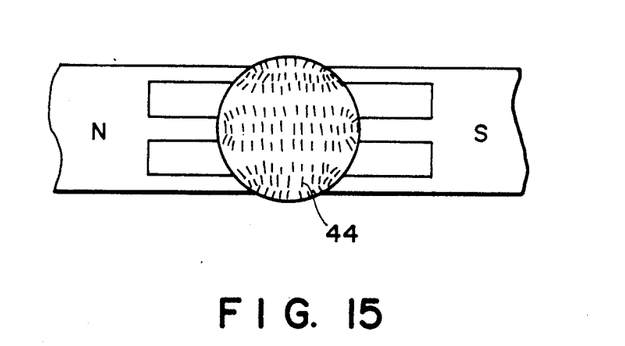
FIG. 15 is a cross-sectional view showing a state in which a resin magnet material has been injected and oriented into the cavity.

When in the state in which the magnetic flux forms a closed loop as described above, molten resin magnet material (ferromagnetic powder and a binder) is poured into the cavity 36, as shown in FIG. 15, orientation of magnetic powder 44 occurs in accordance with the flow of the magnetic line of force shown in FIG. 14. The magnetic line of force widens in the cavity and converges in the magnetic pole portion as shown in FIG. 14 and therefore, the magnetic powder is oriented in its converged state in the magnetic pole portion as shown in FIG. 15. For the purpose of such orientation, the magnetic powder in the molded article is used effectively and the magnetic line of force is concentrated at a desired position of the molded article and therefore, there can be obtained a magnet roller of a high surface magnetic flux density and a strong magnetic force. When the magnet roller is cooled and solidified while the oriented state of the magnetic powder as shown in FIG. 15 is maintained, and then is taken out, there is obtained the molded article shown in FIG. 16. The subsequent distribution of surface magnetic flux density of the molded article shown in FIG. 16 is such as shown in FIG. 17.

Figure 16:
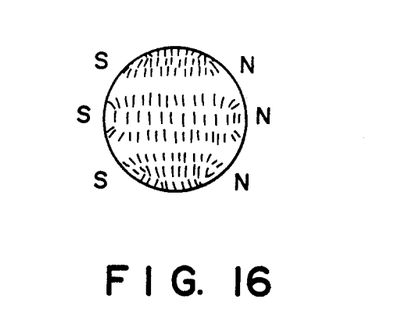
FIG. 16 is a cross-sectional view of a magnet roller after molded and taken out.

Subsequently, the molded article shown in FIG. 16 is demagnetized by a conventional method to remove only the magnetism thereof while the orientation thereof remains fixed. Then, the poles oriented in opposed relationship with the finally required magnetic property are re-magnetized in the finally necessary magnetic direction by a magnetizer shown in FIG. 20, whereby there is obtained a molded article whose magnetized state is as shown in FIG. 18. Reference numeral 100 designates the molded article, reference numeral 101 denotes a yoke, and reference numeral 102 designates a coil. The subsequent distribution of surface magnetic flux density is shown in FIG. 19.

Figure 24:
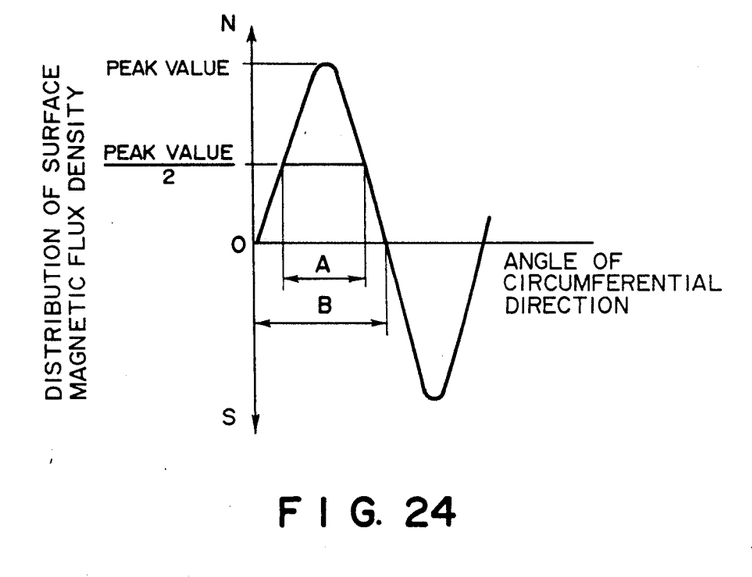
FIG. 24 illustrates a half value time width.

Plastic magnet rollers having four poles and six poles, respectively, have been made by the method as described above, and have been evaluated. The evaluation is compared with a representative specification generally necessary as a developing roller for a copying apparatus having a maximum surface magnetic flux density of 900 [G]. or more and a half value time width of 60% or less. The half value time width is expressed as the following equation by the use of A and B shown in FIG. 24:

*Half value time width* $=(A/B)\times 100[\%]$ (The greater is this value, the wider is the wave form.)

As test 1, the four-pole magnet roller of the present invention and the conventional polar anisotropically oriented article and two-pole oriented article were tested, and as test 2, the six-pole magnet roller of the present invention and the conventional polar anisotropically oriented article and two-pole oriented article were tested, and the results of these tests are shown in Tables 1 and 2 below. The sample material used in any of these tests was a mixture of a conventional plastic magnet material and 90% by weight of strontium ferrite, and injection molding was carried out at a metal mold temperature of 110° C. and a molding temperature of 280° C., whereby two kinds of magnet rollers having a diameter of 20 mm and a diameter of 14 mm, respectively, were manufactured.

TABLE 1

|  | Diameter | Polar anisotropic orientation | 2-pole orientation | Invention |
|---|---|---|---|---|
| Maximum surface magnetic flux density [G] | 20 mm | 920 | 880 | 980 |
|  | 14 mm | 810 | 750 | 830 |
| Half value time width [%] | 20 mm | 50 | 75 | 50 |
|  | 14 mm | 50 | 75 | 50 |
| Decision |  | O | X | ◉ |

TABLE 2

|  | Diameter | Polar anisotropic orientation | 2-pole orientation | Invention |
|---|---|---|---|---|
| Maximum surface magnetic flux density [G] | 20 mm | 880 | 820 | 950 |
|  | 14 mm | 780 | 720 | 810 |
| Half value time width [%] | 20 mm | 50 | 70 | 50 |
|  | 14 mm | 50 | 70 | 50 |
| Decision |  | X | X | ◉ |

As can be seen from the results shown in Tables 1 and 2, the magnet rollers according to the present invention have great surface magnetic flux densities in reserve and therefore, it is possible to reduce the diameters thereof correspondingly. In the ordinary developing device, a magnet roller is used while being fitted in a developing ring with toner disposed around it, as shown in FIG. 22.

Figure 22:
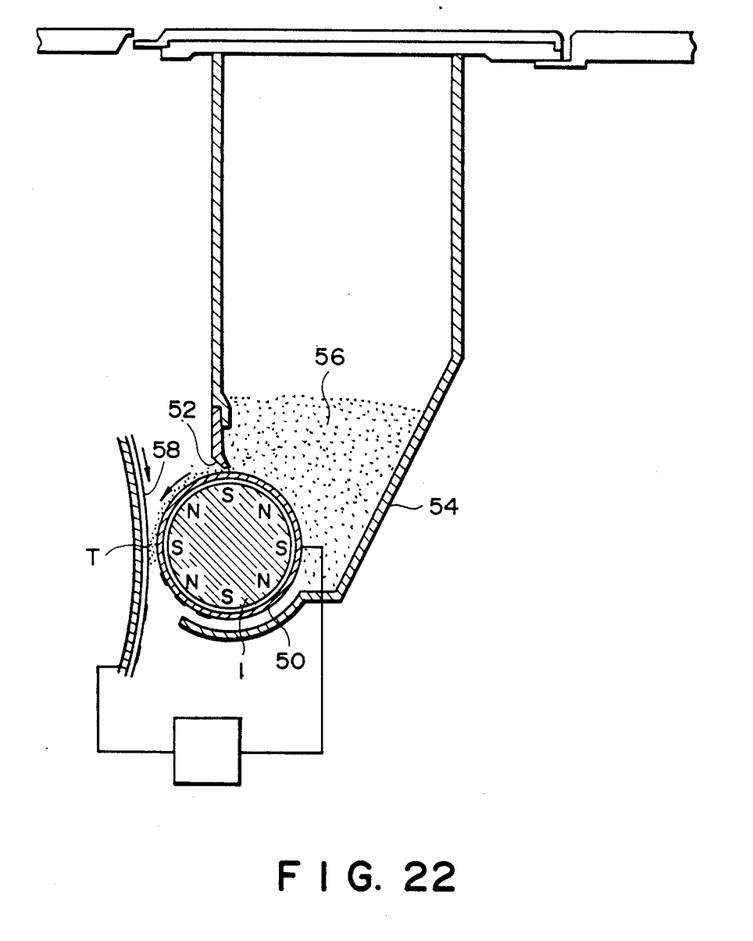
FIG. 22 is a schematic view showing the magnet roller as it is mounted in a developing device.

In FIG. 22, reference numeral 50 designates a non-magnetic sleeve rotatable in the direction of the arrow, and reference numeral 1 denotes a magnet roll enveloped in the non-magnetic sleeve 50 and formed by the aforedescribed method. Reference numeral 52 designates a blade as magnetic material applying means. The blade 52 is disposed with a minute gap maintained between it and the surface of the sleeve 50, and may apply the magnetic toner in a hopper 54 onto the sleeve by a magnetic force while controlling the thickness of the toner applied. Reference numeral 58 denotes a latent image bearing member bearing thereon a latent image such as an electrostatic image. The latent image bearing member 58 is movable in the direction of the arrow and is subjected to development by a uniform toner layer at a developing station T.

The gap between the magnet roller and the developing ring will facilitate the mounting of the magnet roller if it is large to some degree and therefore, reducing the diameter of the magnet roller by the application of the present invention is very useful.

Although the injection molding method has been used in the above-described embodiment, any other means may be used as the molding method. The manufacturing method of the present invention is applicable not only to the orientation-molding method for resin magnets but also to the orientation-molding method for sintered magnets. Also, the positions of the magnetic poles of the metal mold need not be strictly opposed positions if design is made so as to provide permeance between caps disposed at substantially opposed positions in which the magnetic flux is not liable to leak out of the cavity in accordance with the gist of the present invention, instead of the structure as shown in FIG. 3 wherein the magnetic flux readily leaks out of the cavity, and it is of course possible to shift said positions in conformity with the required distribution characteristic of the finished product. Further the ferromagnetic material forming the magnetic poles $30a_1$, $30a_2$, $30a_3$, $30b_1$, $30b_2$ and $30b_3$ in FIG. 14 is not limited to the same material as previously mentioned but may be a combination of materials different in magnetic permeability and saturated magnetic flux density. Furthermore, the molded article and cavity are not limited to a cylindrical shape, but may also be of a hollow shape. Still further, the manufacturing method of the present invention is not limited to the manufacture of magnet rollers, but may also be suitably used as a method of manufacturing rotors for motors, magnets for encoders, etc.

As described above, according to the magnet roller manufacturing method of the present invention, the magnetic poles in the metal mold assume opposed magnetic pole structures in which all of the magnetic poles face in the same direction and therefore, a surplus of the space is provided along the parting surface to facilitate the provision of a number of metal molds and thus, the productivity can be enhanced three to six times.

Also, the magnetic flux for orientation is converged to a location which requires the magnetic force and the vector of the readily magnetizable axis of the magnetic powder (which means the center axis of the magnetic powder facing so as to be along the magnetic line of force) is converged and therefore, a greatly improved performance is achieved with regard to the characteristic of surface magnetic flux density.

Also, if the amount of magnetic flux passing between the magnetic poles is varied to vary the volume ratio of the magnetic powder used, it will be possible to control the distribution of surface magnetization density in the fully magnetized state.

Figure 20:
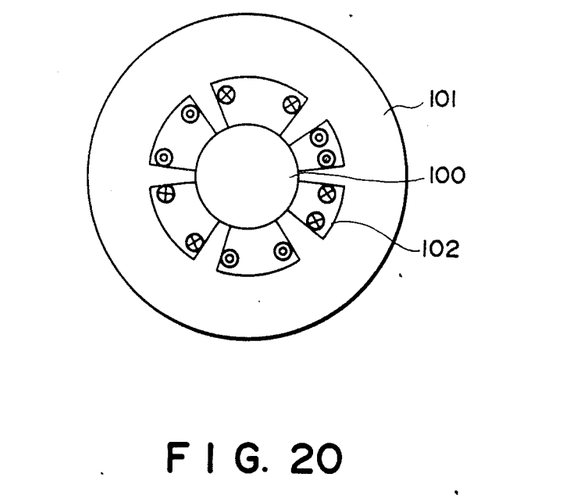
FIG. 20 is a schematic view of a magnetizer.
Figure 21:
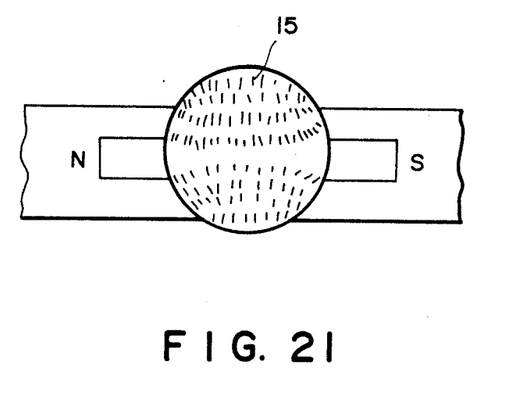
FIG. 21 is a view similar to FIG. 15 but showing a four-pole arrangement.
Figure 23:
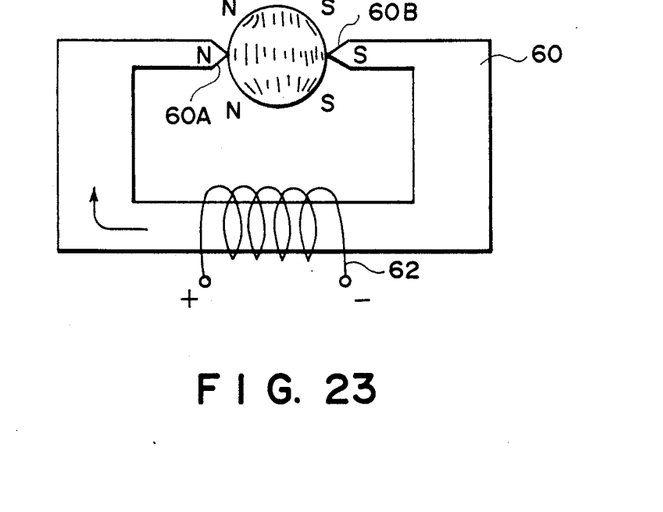
FIG. 23 shows another example of the magnetization.

FIG. 23 shows an example in which the molded article orientation-molded in FIG. 14 is magnetized like the molded magnet of FIG. 18 by a magnetizing apparatus different from that shown in FIG. 20.

In FIG. 23, reference numeral 60 designates a magnetizing yoke. An exciting coil 62 is wound on the magnetizing yoke 60, and the ends 60A and 60B of the yoke are disposed in proximity to the outer periphery of the central portion in which the six poles of the aforementioned molded article are oriented, and are magnetized under the conditions of 500 turns of the coil and 62.

What is claimed is:

1. A method for manufacturing a magnet having a plurality of pairs of magnetic poles comprising the steps of:
   setting a molding apparatus for molding a resin material including magnetic powder into a predetermined shape, the molding apparatus having a cavity for pouring the resin therethrough and magnetic flux generating means for applying the magnetic flux to the resin material, the cavity being defined by a non-magnetic material and pairs of magnetic pole members, with each pair having a starting magnetic pole and a terminal magnetic pole and being made of ferromagnetic material, with the number of magnetic pole members being the same as the number of magnetic poles of the magnet, and the magnetic powder being oriented so that in the central portion of the molded article the magnetic powder is substantially parallel with a line connecting a starting magnetic pole and a terminal magnetic pole such that the magnetic powder in a peripheral portion of the molded article converges toward the central portion of a magnetic peak formed between the starting magnetic pole and the terminal magnetic pole;
   demagnetizing the molded product; and
   magnetizing the molded product by a magnetizing apparatus having the same number of magnetizing poles as the magnetic poles of the magnet, the magnetic powder of the central portion of the molded product being magnetized in the same direction of the magnetic poles of the magnet.

2. A method of manufacturing a magnet according to claim 1, wherein a pair of magnetic pole members in the molding apparatus has a larger sectional area at the surface of the cavity than the other pairs of magnetic pole members.

3. A method for manufacturing a magnetic according to claim 1, wherein a pair of magnetic pole members in the molding apparatus has a larger saturated magnetic flux density than the other pairs of magnetic pole members.

4. A magnet comprising:
   a plurality of pairs of magnetic poles, with each said pair having a starting magnetic pole and a terminal magnetic pole; and
   magnetic powder mixed with resin material, wherein the magnetic powder in a central portion of the magnet is oriented in a direction substantially parallel with a line connecting a starting magnetic pole and a terminal magnetic pole, and the magnetic powder in a peripheral portion of the magnet is oriented in a direction converging toward the central portion of the magnetic peak between the starting magnetic pole and the terminal magnetic pole, and further wherein a pair of magnetic poles in the magnet have a magnetic force greater than said other pairs of magnetic poles.

* * * * *

UNITED STATES PATENT AND TRADEMARK OFFICE
CERTIFICATE OF CORRECTION

PATENT NO. : 4,954,800
DATED : September 4, 1990
INVENTOR(S) : Naoji Ohtsuka It is certified that error appears in the above-identified patent and that said Letters Patent is hereby corrected as shown below:

COLUMN 4:

Line 7, "problem at" should read --problem.  At--.

Line 36, "gap" should read --gaps--.

Line 66, "an" should read --can--.

COLUMN 5:

Line 25, "orientation, also," should read --orientation.  Also,--.

COLUMN 6:

Line 59, "molded" should read --being molded--.

Line 62, "molded" should read --being molded--.

Line 64, "magnetized." should read --being magnetized.--.

Line 67, "magnetized." should read --being magnetized.--.

UNITED STATES PATENT AND TRADEMARK OFFICE
CERTIFICATE OF CORRECTION

PATENT NO. : 4,954,800
DATED : September 4, 1990
INVENTOR(S) : Naoji Ohtsuka

It is certified that error appears in the above-identified patent and that said Letters Patent is hereby corrected as shown below:

COLUMN 7:

Line 11, "anistropic" should read --anisotropic--.

Line 63, "or" should read --of--.

Line 67, "powder" should read --powder.--.

Line 68, "in" (first occurrence) should read --In--.

COLUMN 10:

Line 46, "produce" should read --produced passes--.

COLUMN 14:

Line 24, "magnetic" should read --magnet--.

Signed and Sealed this

Twenty-eighth Day of April, 1992

*Attest:*

HARRY F. MANBECK, JR.

*Attesting Officer*      *Commissioner of Patents and Trademarks*